(12) United States Patent
Kuze et al.

(10) Patent No.: US 12,014,761 B2
(45) Date of Patent: Jun. 18, 2024

(54) OPTICAL DISC DEVICE AND RECORDING AND REPRODUCTION DEVICE

(71) Applicant: Panasonic Intellectual Property Management Co., Ltd., Osaka (JP)

(72) Inventors: Yuuichi Kuze, Osaka (JP); Masatoshi Yajima, Osaka (JP); Shinichi Konishi, Nara (JP); Akihiko Nishioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/030,226

(22) PCT Filed: Oct. 6, 2021

(86) PCT No.: PCT/JP2021/036927
§ 371 (c)(1),
(2) Date: Apr. 4, 2023

(87) PCT Pub. No.: WO2022/080202
PCT Pub. Date: Apr. 21, 2022

(65) Prior Publication Data
US 2024/0021214 A1 Jan. 18, 2024

(30) Foreign Application Priority Data
Oct. 15, 2020 (JP) .................................. 2020-173904

(51) Int. Cl.
*G11B 7/0037* (2006.01)
*G01N 21/95* (2006.01)
(Continued)

(52) U.S. Cl.
CPC ..... *G11B 7/00375* (2013.01); *G01N 21/9506* (2013.01); *G11B 7/127* (2013.01); *G11B 2007/0006* (2013.01)

(58) Field of Classification Search
CPC ................ G11B 7/00375; G11B 7/127; G11B 2007/0006; G01N 21/9506
See application file for complete search history.

(56) References Cited

U.S. PATENT DOCUMENTS

| 5,559,770 A | 9/1996 | Hiroki et al. |
| 2005/0117465 A1 | 6/2005 | Kishimoto et al. |

(Continued)

FOREIGN PATENT DOCUMENTS

| JP | 07-065389 A | 3/1995 |
| JP | 2005-149703 A | 6/2005 |

(Continued)

OTHER PUBLICATIONS

International Search Report issued on Dec. 28, 2021 in International Patent Application No. PCT/JP2021/036927, with English translation.

(Continued)

*Primary Examiner* — Andrew Sasinowski
(74) *Attorney, Agent, or Firm* — Rimon P.C.

(57) ABSTRACT

An optical disc device includes: an optical pickup including a first laser light source that emits laser light, an objective lens that focuses the laser light emitted from the first laser light source onto an optical disc, and a light receiving element that receives reflected light from the optical disc, and performs photoelectric conversion on the reflected light received to output a received-light signal; an FS signal generator that generates an FS signal indicating the light amount of the reflected light from the optical disc, based on the received-light signal from the light receiving element;

(Continued)

and a dirt determiner that determines that dirt is present in the optical pickup, when the peak level of the FS signal is less than a dirt determination threshold, and controls the light receiving element to increase the peak level of the received-light signal from the light receiving element.

3 Claims, 7 Drawing Sheets

(51) Int. Cl.
  *G11B 7/127* (2012.01)
  *G11B 7/00* (2006.01)

(56) References Cited

U.S. PATENT DOCUMENTS

| | | |
|---|---|---|
| 2006/0215500 A1 | 9/2006 | Hatanaka et al. |
| 2007/0070850 A1 | 3/2007 | Watanabe et al. |
| 2007/0253305 A1 | 11/2007 | Watanabe et al. |
| 2009/0034399 A1 | 2/2009 | Hosokawa et al. |
| 2009/0290479 A1 | 11/2009 | Mimura et al. |
| 2015/0131421 A1* | 5/2015 | Mimura ................ G11B 19/12 |
| | | 369/47.49 |

FOREIGN PATENT DOCUMENTS

| | | |
|---|---|---|
| JP | 2006-155859 A | 6/2006 |
| JP | 2006-228401 A | 8/2006 |
| JP | 2007-122850 A | 5/2007 |
| JP | 2009-283100 A | 12/2009 |
| JP | 2011-008855 A | 1/2011 |
| JP | 2012-190505 A | 10/2012 |

OTHER PUBLICATIONS

Extended European Search Report dated Mar. 14, 2024 issued in the corresponding European Patent Application No. 21879942.7.

* cited by examiner

FE signal = (A+C) - (B+D)
TE signal = (A+D) - (B+C)
FS signal = A+B+C+D

OPTICAL DISC DEVICE AND RECORDING AND REPRODUCTION DEVICE

CROSS-REFERENCE OF RELATED APPLICATIONS

This application is the U.S. National Phase under 35 U.S.C. § 371 of International Patent Application No. PCT/JP2021/036927, filed on Oct. 6, 2021, which in turn claims the benefit of Japanese Patent Application No. 2020-173904, filed on Oct. 15, 2020, the entire disclosures of which Applications are incorporated by reference herein.

TECHNICAL FIELD

The present disclosure relates to an optical disc device and a recording and reproduction device.

BACKGROUND ART

There is known an optical disc device that records or reproduces information on or from an optical disc by irradiating the optical disc with laser light (see, for example, Patent Literature (PTL) 1 and PTL 2). An optical disc device of this kind includes an optical pickup and a controller. The optical pickup irradiates an optical disc with laser light, receives reflected light from the optical disc, and outputs a received-light signal that is responsive to the received reflected light. The controller generates a focus error signal, a tracking error signal, and so forth on the basis of the received-light signal from the optical pickup.

CITATION LIST

Patent Literature

[PTL 1] Japanese Unexamined Patent Application Publication No. 2006-228401
[PTL 2] Japanese Unexamined Patent Application Publication No. 2009-283100

SUMMARY OF INVENTION

Technical Problem

The present disclosure provides an optical disc device and a recording and reproduction device capable of accurately recording or reproducing information on or from an optical disc even when dirt is present in the optical pickup.

Solution to Problem

The optical disc device in the present disclosure is an optical disc device that records or reproduces information on or from an optical disc by irradiating the optical disc with laser light. Such optical disc device includes: an optical pickup including (i) a laser light source that emits laser light, (ii) an objective lens that focuses the laser light emitted from the laser light source onto the optical disc, and (iii) a light receiving element that receives reflected light from the optical disc, and performs photoelectric conversion on the reflected light received to output a received-light signal; a light amount signal generator that generates a light amount signal indicating a light amount of the reflected light from the optical disc, based on the received-light signal from the light receiving element; and a dirt determiner that determines that dirt is present in the optical pickup, when a peak level of the light amount signal is less than a first threshold, and controls the laser light source or the light receiving element to increase a peak level of the received-light signal from the light receiving element.

Advantageous Effects of Invention

The optical disc device and so forth in the present disclosure are capable of accurately recording or reproducing information on or from an optical disc even when dirt is present in the optical pickup.

DESCRIPTION OF EMBODIMENTS

The exemplary embodiments will now be described herein in detail with reference to the drawings where necessary. Note, however, that detailed description more than necessary may be omitted. For example, detailed description of a well-known matter or repetitive description of substantially the same configuration may be omitted. This is to prevent the following description from becoming redundant more than necessary, and to help those skilled in the art easily understand the following description.

Note that the inventors provide the attached drawings and the following description for those skilled in the art to fully understand the present disclosure, and do not intend to limit the spirit and scope of the appended claims.

Embodiment 1

Hereinafter, Embodiment 1 will be described with reference to FIG. 1 through FIG. 5.

1-1. Configuration of Optical Disc Device

Figure 1:
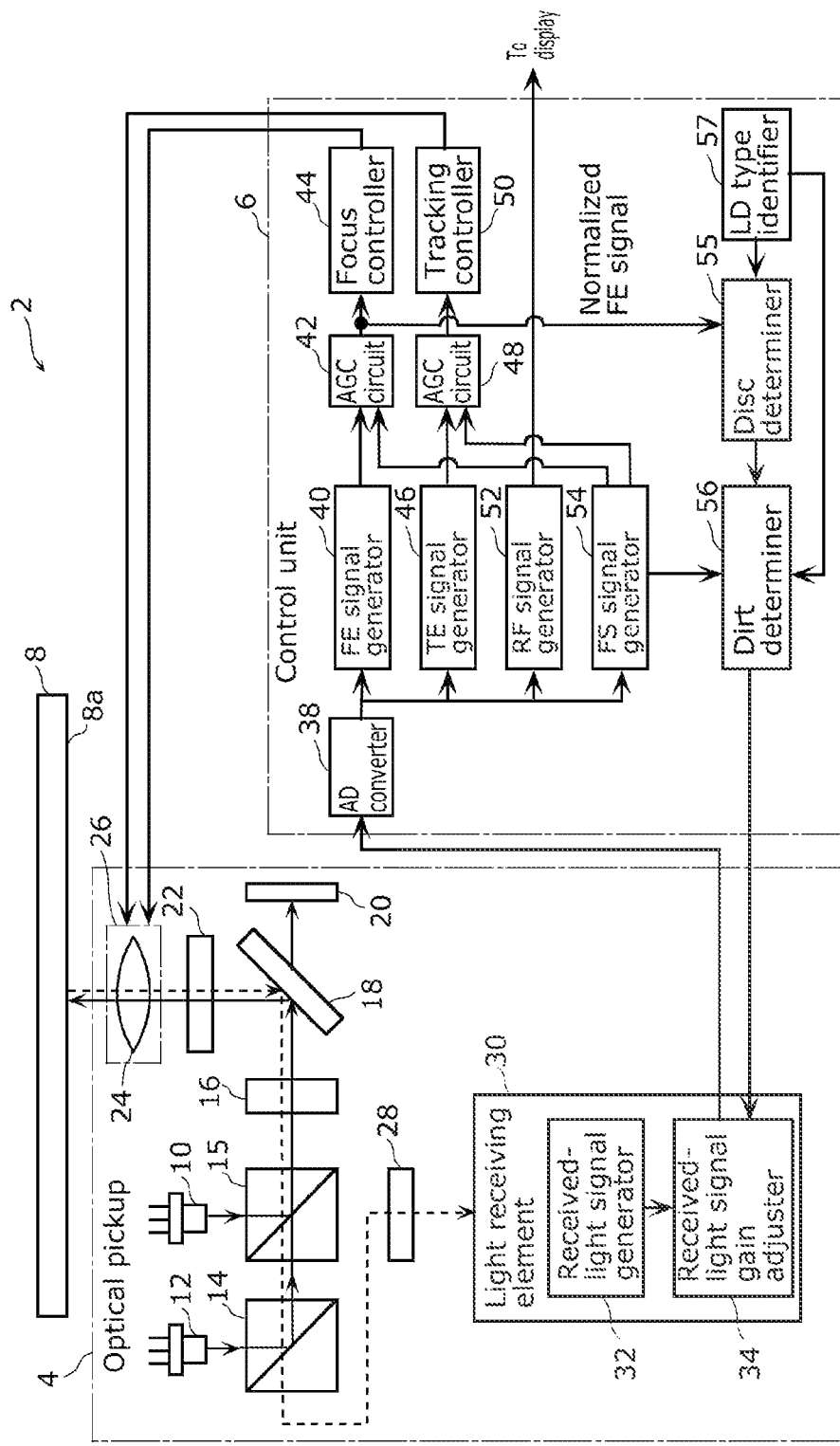
FIG. 1 is a diagram showing the configuration of an optical disc device according to Embodiment 1.
Figure 2:
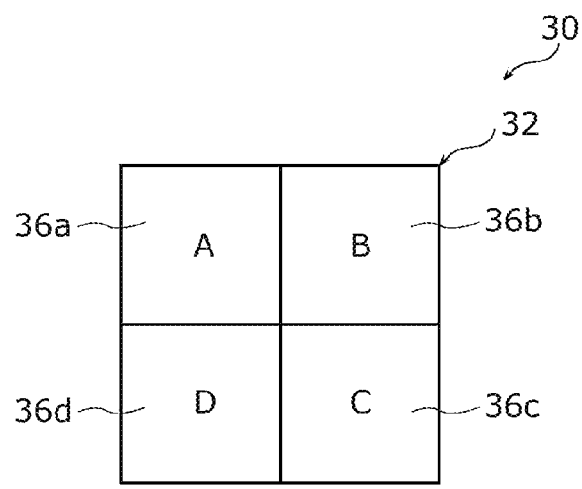
FIG. 2 is a diagram showing a light receiving element of the optical disc device according to Embodiment 1.

First, with reference to FIG. 1 and FIG. 2, the configuration of optical disc device 2 according to Embodiment 1 will be described. FIG. 1 is a diagram showing the configuration of optical disc device 2 according to Embodiment 1. FIG. 2 is a diagram showing light receiving element 30 of optical disc device 2 according to Embodiment 1.

As shown in FIG. 1, optical disc device 2 according to Embodiment 1 includes optical pickup 4 and control unit 6. Optical disc device 2 is included in, for example, a Blu-ray® disc (BD) recorder (an example of the recording and reproduction device) capable recording or reproducing information on or from optical disc 8. Although not illustrated in the drawings, optical disc device 2 is connected, for example, to a display such as a liquid-crystal television receiver.

Optical disc 8 comprises a BD, a digital versatile disc (DVD), and a compact disc (CD). BD is an example of a first optical disc, and DVD and CD are examples of a second optical disc. When inserted to inside of optical disc device 2, optical disc 8 is caused to spin by a spindle motor (not illustrated) with the periphery of the diameter center of optical disc 8 chucked.

Optical pickup 4 is an optical pickup unit (OPU) for recording or reproducing information on or from optical disc 8. Optical pickup 4 includes first laser light source 10, second laser light source 12, first beam splitter 14, second beam splitter 15, collimating lens 16, reflector 18, front monitor 20, quarter wavelength plate 22, objective lens 24, lens actuator 26, cylindrical lens 28, and light receiving element 30.

First leaser light source 10 is a laser diode (LD) that emits laser light for BD having the wavelength of 405 nm. The laser light for BD is an example of first laser light.

Second laser light source 12 is a dual-wavelength LD that is capable of emitting laser light for DVD having the wavelength of 650 nm and laser light for CD having the wavelength of 780 nm. The laser light for DVD and the laser light for CD are examples of second laser light. Although the present embodiment describes second laser light source 12 as a dual-wavelength LD, the present disclosure is not limited to this. A third laser light source (not illustrated) may be provided separately from second laser light source 12 so that second laser light source 12 serves as an LD that emits laser light for DVD and the third laser light source serves as an LD that emits laser light for CD.

First beam splitter 14 reflects the laser light from second laser light source 12. The laser light reflected by first beam splitter 14 is sent to second beam splitter 15.

Second beam splitter 15 allows the laser light from second laser light source 12 to pass through second beam splitter 15, and reflects the laser light from first laser light source 10. The laser light that has passed through or reflected by second beam splitter 15 is sent to collimating lens 16.

Collimating lens 16 converts the laser light sent from second beam splitter 15 into collimated light. The laser light converted into the collimated light by collimating lens 16 is sent to reflector 18.

Reflector 18 reflects the laser light sent from collimating lens 16 and guides it toward quarter wavelength plate 22. Reflector 18 also allows part of the laser light sent from collimating lens 16 to pass through reflector 18, and guides it toward front monitor 20.

Front monitor 20 generates an electric signal that is responsive to the intensity of the incoming laser light, and controls the intensity of each of the laser light beams emitted from first laser light source 10 and second laser light source 12 so that the electric signal remains constant.

Quarter wavelength plate 22 has a function of converting linearly polarized light into circular polarized light and converting circular polarized light into linearly polarized light. Quarter wavelength plate 22 is intended for causing each laser light reflected by optical disc 8 not to return to first laser light source 10 and second laser light source 12.

Objective lens 24 focuses the laser light sent from quarter wavelength plate 22. The laser light focused by objective lens 24 is reflected at recording surface 8a of optical disc 8.

Lens actuator 26 drives objective lens 24 in, for example, the focus direction and the tracking direction. Lens actuator 26 is controlled by focus controller 44 and tracking controller 50 to be described later.

The laser light reflected at recording surface 8a of optical disc 8 (reflected light) returns back through objective lens 24, quarter wavelength plate 22, reflector 18, collimating lens 16, second beam splitter 15, and first beam splitter 14, and enters light receiving element 30 via cylindrical lens 28.

Cylindrical lens 28 causes astigmatism to occur in the laser light sent from first beam splitter 14. The laser light that has passed through cylindrical lens 28 is sent to light receiving element 30.

Light receiving element 30 is an optoelectronic integrated circuit (OEIC). Light receiving element 30 includes received-light signal generator 32 and received-light signal gain adjuster 34.

Received-light signal generator 32 receives the reflected light from optical disc 8 and performs photoelectric conversion on the received reflected light, thereby generating received-light signals. More specifically, as shown in FIG. 2, received-light signal generator 32 includes photodiodes 36a, 36b, 36c, and 36d (36a through 36d) that are arranged, for example, in two rows and two columns. Received-light signal generator 32 performs photoelectric conversion on the reflected light received by photodiodes 36a through 36d, thereby generating received-light signals.

Received-light signal gain adjuster 34 amplifies, at a predetermined amplification factor, the received-light signals generated by received-light signal generator 32. Received-light signal gain adjuster 34 is capable of switching the levels of the predetermined amplification factor between, for example, three levels (high level, middle level, and low level). Received-light signal gain adjuster 34 outputs the received-light signals amplified at the predetermined amplification factor to control unit 6.

Control unit 6 includes AD converter 38, FE signal generator 40, automatic gain control (AGC) circuit 42, focus controller 44, TE signal generator 46, AGC circuit 48, tracking controller 50, RF signal generator 52, FS signal generator 54, disc determiner 55, dirt determiner 56, and LD type identifier 57. Control unit 6 is formed by, for example, a digital signal processor (DSP).

AD converter 38 converts each of the received-light signals from light receiving element 30 from an analog signal into a digital signal. AD converter 38 outputs the received-light signals converted into digital signals to FE signal generator 40, TE signal generator 46, RF signal generator 52, and FS signal generator 54.

FE signal generator 40 generates a focus error signal (hereinafter "FE signal"), on the basis of the received-light signals from AD converter 38. More specifically, as shown in FIG. 2, FE signal generator 40 generates the FE signal that equals to (A+C)−(B+D) by calculating the difference between: (A+C), which is obtained by adding received-light signal A received by photodiode 36a of light receiving element 30 and received-light signal C received by photodiode 36c of light receiving element 30; and (B+D), which is obtained by adding received-light signal B received by photodiode 36b of light receiving element 30 and received-light signal D received by photodiode 36d of light receiving element 30. FE signal generator 40 outputs the generated FE signal to AGC circuit 42.

AGC circuit 42 generates a normalized focus error signal (hereinafter "normalized FE signal") that is the ratio between the FE signal from FE signal generator 40 and an FS signal from FS signal generator 54 (FE signal/FS signal). With this, AGC circuit 42 performs processing of normalizing the amplitude of the FE signal to a fixed value (automatic gain control: AGC) regardless of the amount of reflected light. AGC circuit 42 outputs the normalized FE signal to focus controller 44 and disc determiner 55. Note that AGC circuit 42 is an example of a first automatic gain controller.

Focus controller 44 generates a focus control signal for controlling the driving of lens actuator 26, on the basis of the normalized FE signal from AGC circuit 42, and outputs the generated focus control signal to lens actuator 26. Lens actuator 26 causes objective lens 24 to move in the focus direction (which is the direction approaching and away from recording surface 8a of optical disc 8), on the basis of the focus control signal from focus controller 44. Through this, the focus control is performed for adjusting the position of objective lens 24 in the focus direction so that laser light emitted from objective lens 24 is focused onto recording surface 8a of optical disc 8.

TE signal generator 46 generates a tracking error signal (hereinafter "TE signal"), on the basis of the received-light signals from AD converter 38. More specifically, as shown in FIG. 2, TE signal generator 46 generates the TE signal that equals to (A+D)−(B+C) by calculating the difference between: (A+D), which is obtained by adding received-light signal A received by photodiode 36a of light receiving element 30 and received-light signal D received by photodiode 36d of light receiving element 30; and (B+C), which is obtained by adding received-light signal B received by photodiode 36b of light receiving element 30 and received-light signal C received by photodiode 36c of light receiving element 30. TE signal generator 46 outputs the generated TE signal to AGC circuit 48.

AGC circuit 48 generates a normalized tracking error signal (hereinafter "normalized TE signal") that is the ratio between the TE signal from TE signal generator 46 and the FS signal from FS signal generator 54 (TE signal/FS signal). Through this, AGC circuit 48 performs processing of normalizing the amplitude of the TE signal to a fixed value. AGC circuit 48 outputs the normalized TE signal to tracking controller 50. Note that AGC circuit 48 is an example of a second automatic gain controller.

Tracking controller 50 generates a tracking control signal for controlling the driving of lens actuator 26, on the basis of the normalized TE signal from AGC circuit 48, and outputs the generated tracking control signal to lens actuator 26. Lens actuator 26 causes objective lens 24 to move in the tracking direction (which is the direction of the radius of optical disc 8), on the basis of the tracking control signal from tracking controller 50. Through this, the tracking control is performed for adjusting the position of objective lens 24 in the tracking direction so that laser light emitted from objective lens 24 is kept on the track on recording surface 8a of optical disc 8.

RF signal generator 52 generates an RF (radio frequency) signal for reproducing information recorded on optical disc 8, on the basis of the received-light signals from AD converter 38. The RF signal is a reproduction signal that includes a video signal and an audio signal. RF signal generator 52 outputs the generated RF signal onto a display via a demodulation signal processing circuit (not illustrated) and a video decoding circuit (not illustrated).

FS signal generator 54 generates a focus sum signal (hereinafter "FS signal") indicating the light amount of the reflected light from optical disc 8, on the basis of the received-light signals from AD converter 38. More specifically, as shown in FIG. 2, FS signal generator 54 generates the FS signal that equals to A+B+C+D by adding received-light signal A received by photodiode 36a of light receiving element 30, received-light signal B received by photodiode 36b of light receiving element 30, received-light signal C received by photodiode 36c of light receiving element 30, and received-light signal D received by photodiode 36d of light receiving element 30. FS signal generator 54 outputs the generated FS signal to AGC circuit 42, AGC circuit 48, and dirt determiner 56. Note that the FS signal is an example of a light amount signal, and FS signal generator 54 is an example of a light amount signal generator.

On the basis of information from LD type identifier 57 indicating, for example, that "optical disc 8 is currently irradiated with laser light for BD", disc determiner 55 determines the type of optical disc 8 on the basis of a comparison between the peak-to-peak amplitude (P-P amplitude) of the normalized FE signal from AGC circuit 42 and a BD determination threshold (an example of a second threshold), for example. Note that the P-P amplitude refers to amplitude of the extreme peaks (peak to peak) in the temporal axis.

In response to the determination result of disc determiner 55 indicating, for example, that "The present optical disc is a BD. The type of laser light is BD. The combination of the two is correct", dirt determiner 56 determines that dirt (e.g., tobacco dirt to be described later) is present in optical pickup 4, when the peak level of the FS signal is less than a dirt determination threshold (an example of a first threshold) switched by LD type identifier 57. Dirt determiner 56 then controls received-light signal gain adjuster 34 of light receiving element 30 to increase the predetermined amplification factor. Note that the dirt determination threshold differs from type to type of optical disc 8 (BD, DVD, and CD), and is switched by LD type identifier 57. When LD type identifier 57 identifies the type of laser light as laser light for BD, for example, LD type identifier 57 switches the current threshold to the dirt determination threshold for BD. Here, dirt determiner 56 operates, for example, only when the identification result of LD type identifier 57 indicates laser light for BD and the determination result of disc determiner 55 indicates BD.

LD type identifier 57 identifies the type of laser light emitted from first laser light source 10 or second laser light source 12 (laser light for BD, laser light for DVD, or laser light for CD). LD type identifier 57 outputs information indicating the identified type of the laser light (e.g., information indicating that "optical disc 8 is currently irradiated with laser light for BD") to disc determiner 55 and dirt determiner 56.

1-2. Operation of Optical Disc Device

Figure 3:
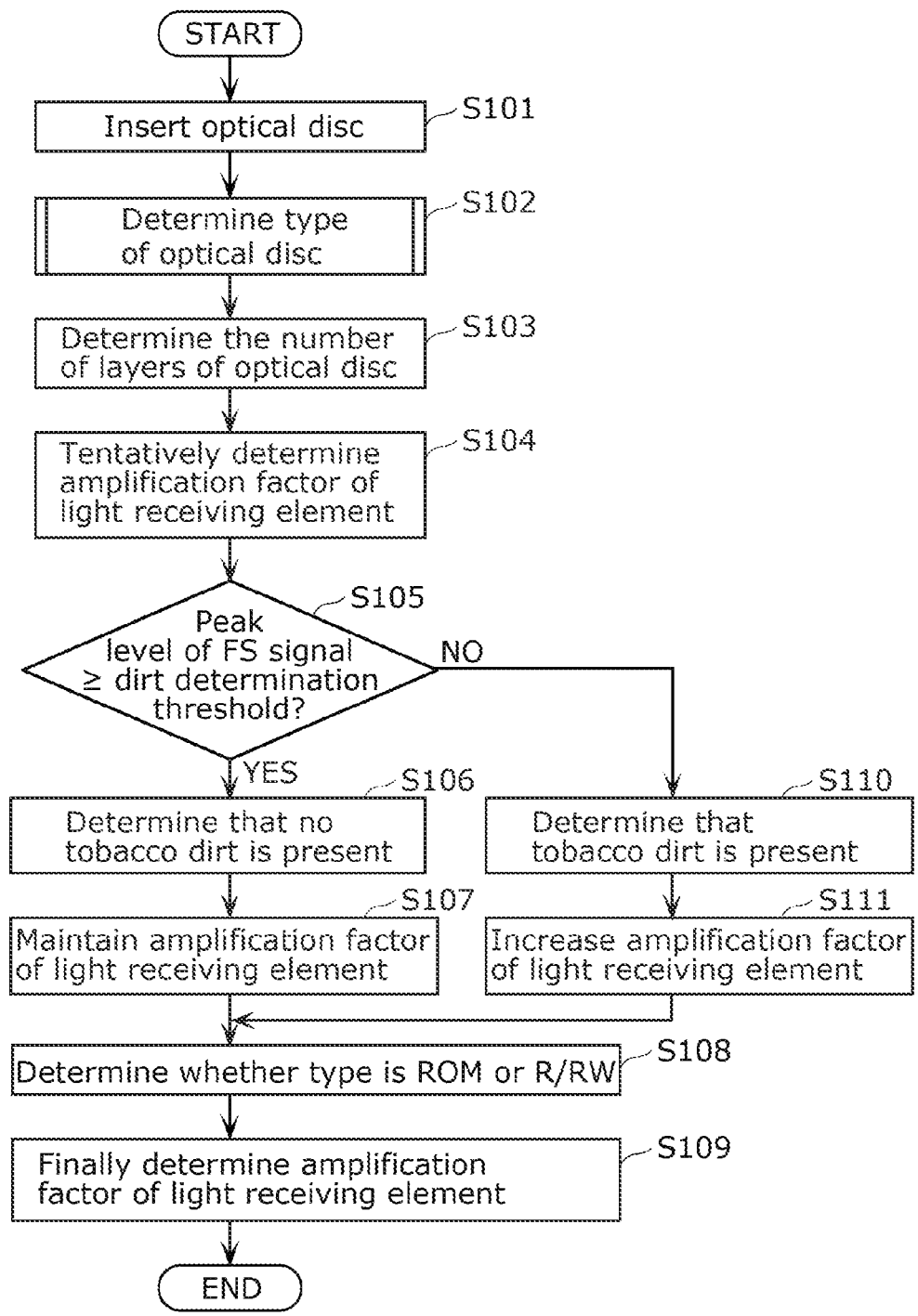
FIG. 3 is a flowchart showing the flow of an operation performed by the optical disc device according to Embodiment 1.
Figure 4:
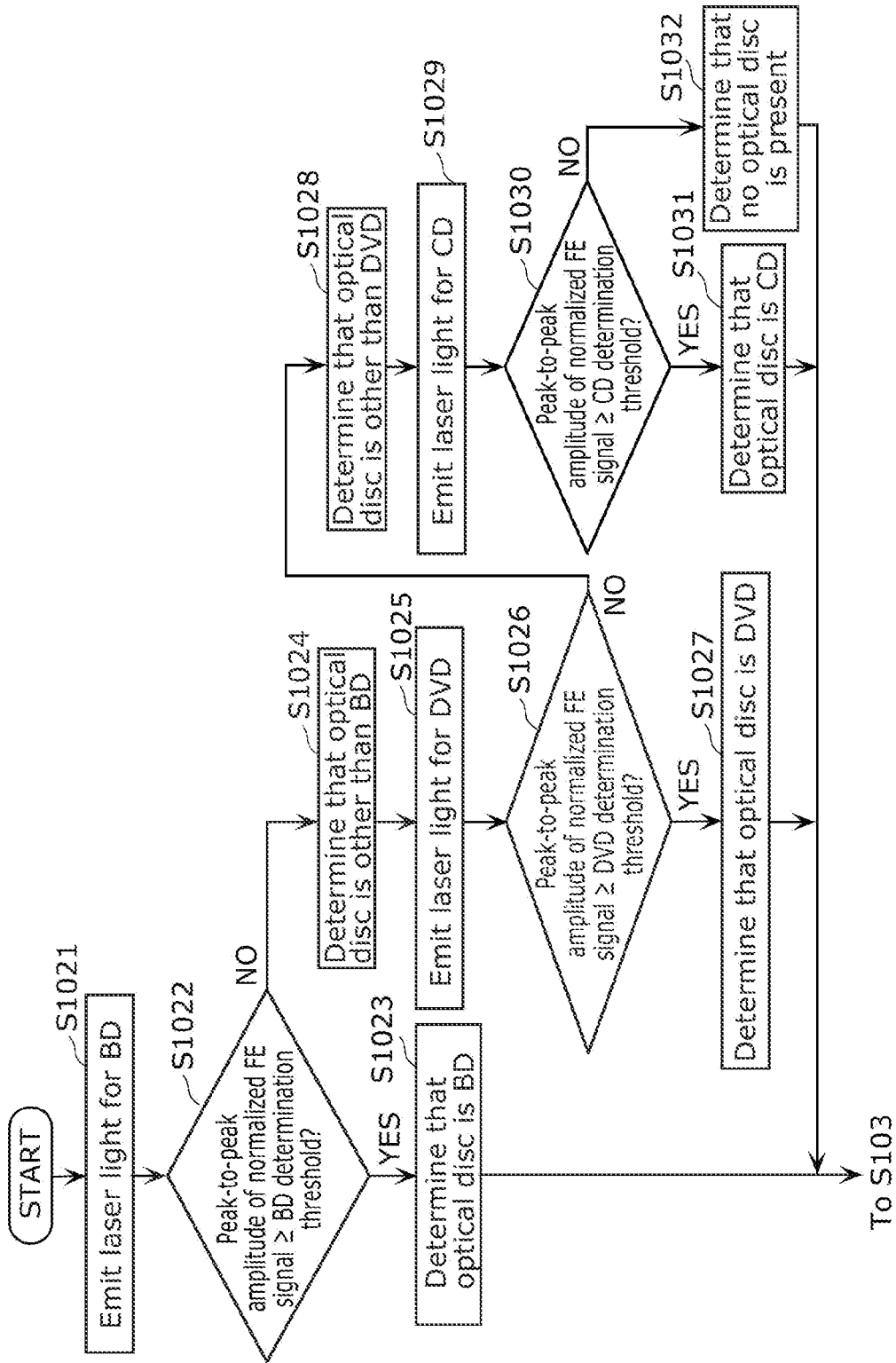
FIG. 4 is a flowchart specifically showing the process of step S102 in FIG. 3.
Figure 5:
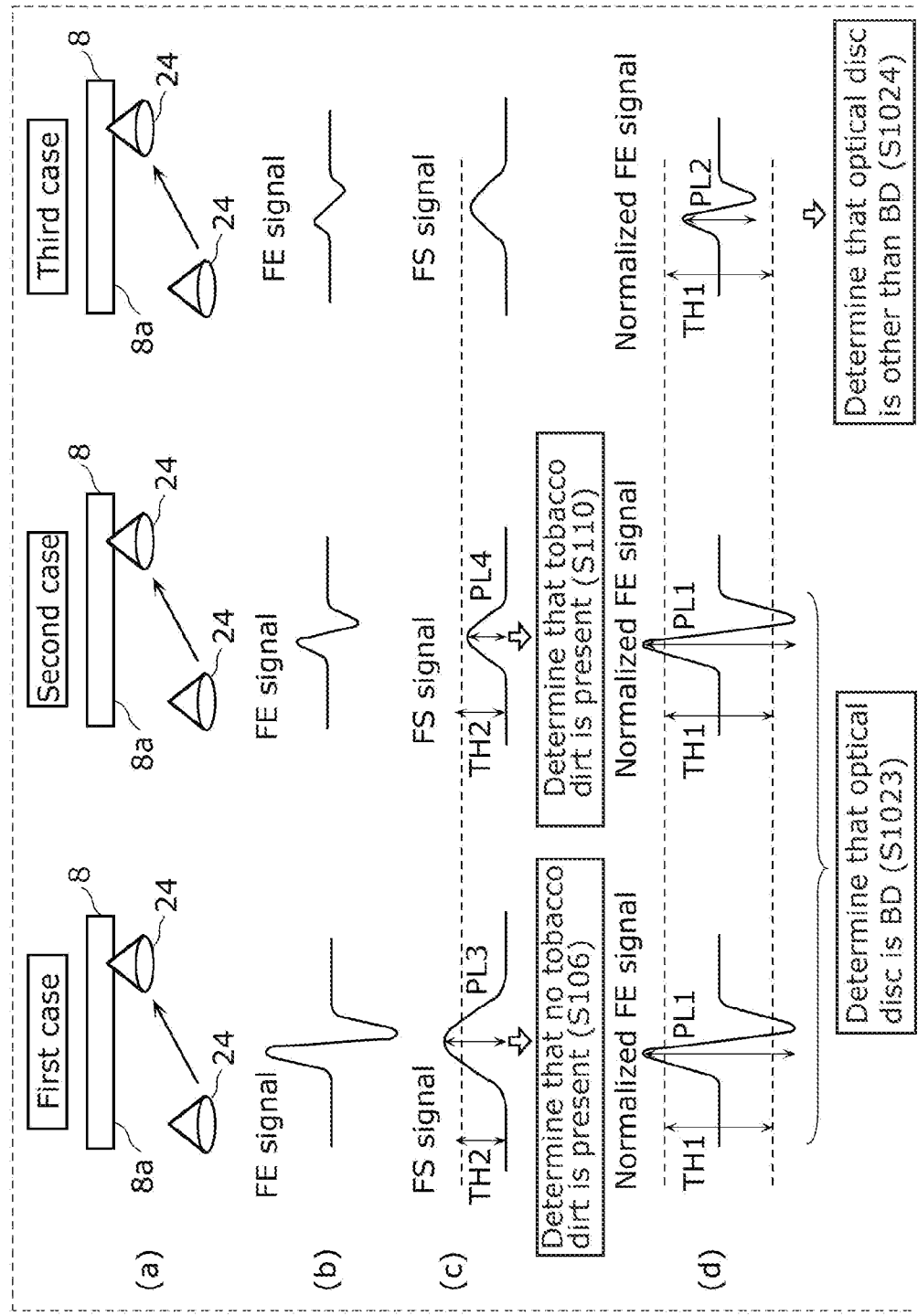
FIG. 5 is a diagram for explaining an operation performed by the optical disc device according to Embodiment 1.

With reference to FIG. 3 through FIG. 5, the following describes an operation performed by optical disc device 2 according to Embodiment 1. FIG. 3 is a flowchart showing the flow of the operation performed by optical disc device 2 according to Embodiment 1. FIG. 4 is a flowchart specifically showing the process of step S102 in FIG. 3. FIG. 5 is a diagram for explaining the operation performed by optical disc device 2 according to Embodiment 1.

First, as shown in FIG. 3, the user places optical disc 8 on the tray (not illustrated) of optical disc device 2, and inserts optical disc 8 placed on the tray to inside of optical disc device 2 (S101).

Next, the type of optical disc 8 placed on the tray is determined (S102). With reference to FIG. 4 and FIG. 5, the following specifically describes the process of step S102 (process of determining the type of optical disc 8) shown in FIG. 3.

Note that in FIG. 5, first case is the case where optical disc 8 is a BD and no tobacco dirt is present in optical pickup 4.

Second case is the case where optical disc 8 is a BD and tobacco dirt is present in optical pickup 4. Third case is the case where optical disc 8 is other than BD (including the case where no optical disc 8 is inserted inside of optical disc device 2). Also note that tobacco dirt refers to dirt inside of optical pickup 4 that is generated due to tobacco smoke entering inside of optical pickup 4.

First, as shown in FIG. 4, laser light for BD from first laser light source 10 is emitted to optical disc 8 (S1021). When this is done, as shown in (a) in FIG. 5, lens actuator 26 causes objective lens 24 to move in the direction approaching recording surface 8a of optical disc 8.

AGC circuit 42 calculates the ratio between the FE signal from FE signal generator 40 ((b) in FIG. 5) and the FS signal from FS signal generator 54 ((c) in FIG. 5) (FE signal/FS signal), thereby generating a normalized FE signal ((d) in FIG. 5). On the basis of information from LD type identifier 57 indicating that "optical disc 8 is currently irradiated with laser light for BD", disc determiner 55 determines whether P-P amplitude PL1 of the normalized FE signal generated by AGC circuit 42 is greater than or equal to BD determination threshold TH1 (S1022).

When P-P amplitude PL1 of the normalized FE signal is greater than or equal to BD determination threshold TH1, as in the first case and the second case in (d) in FIG. 5 (YES in S1022), disc determiner 55 determines that the type of optical disc 8 is BD (S1023).

As shown in (b) and (c) in FIG. 5, the P-P amplitude of the FE signal and the peak level of the FS signal in the second case are lower than the P-P amplitude of the FE signal and the peak level of the FS signal in the first case, respectively. This is because the second case is the case where tobacco dirt is present inside of optical pickup 4. However, the decrease rates of the FE signal and the FS signal in the second case with respect to the FE signal and the FS signal in the first case are almost the same. As such, the ratios between the FE signal and the FS signal (FE signal/FS signal) in the first case and the second case are almost constant. For this reason, when optical disc 8 is a BD, as in the first case and the second case in (d) in FIG. 5, P-P amplitude PL1 of the normalized FE signal is greater than or equal to BD determination threshold TH1, regardless of whether tobacco dirt is present in optical pickup 4.

Returning to step S1022, when P-P amplitude PL2 of the normalized FE signal is less than BD determination threshold TH1 (NO in S1022), as in the third case in (d) in FIG. 5, disc determiner 55 determines that the type of optical disc 8 is other than BD (S1024). In this case, light emission from first laser light source 10 is stopped, and lens actuator 26 causes objective lens 24, which has moved in the direction approaching recording surface 8a of optical disc 8, to move in the direction away from recording surface 8a of optical disc 8. After this, laser light for DVD from second laser light source 12 is emitted to optical disc 8 (S1025). When this is done, lens actuator 26 causes objective lens 24 to move in the direction approaching recording surface 8a of optical disc 8.

As with the foregoing description, on the basis of information from LD type identifier 57 indicating that "optical disc 8 is currently irradiated with laser light for DVD", disc determiner 55 determines whether the P-P amplitude of the normalized FE signal generated by AGC circuit 42 is greater than or equal to a DVD determination threshold (S1026).

When the P-P amplitude of the normalized FE signal is greater than or equal to the DVD determination threshold (YES in S1026), disc determiner 55 determines that the type of optical disc 8 is DVD (S1027).

Meanwhile, when the P-P amplitude of the normalized FE signal is less than the DVD determination threshold (NO in S1026), disc determiner 55 determines that the type of optical disc 8 is other than DVD (S1028). In this case, laser light for CD from second laser light source 12 is emitted to optical disc 8 (S1029). When this is done, as with the foregoing description, lens actuator 26 causes objective lens 24 to move in the direction away from recording surface 8a of optical disc 8, and then causes objective lens 24 to move in the direction approaching recording surface 8a of optical disc 8.

As with the foregoing description, on the basis of information from LD type identifier 57 indicating that "optical disc 8 is currently irradiated with laser light for CD", disc determiner 55 determines whether the P-P amplitude of the normalized FE signal generated by AGC circuit 42 is greater than or equal to a CD determination threshold (S1030).

When the P-P amplitude of the normalized FE signal is greater than or equal to the CD determination threshold (YES in S1030), disc determiner 55 determines that the type of optical disc 8 is CD (S1031).

Meanwhile, when the P-P amplitude of the normalized FE signal is less than the CD determination threshold (NO in S1030), disc determiner 55 determines that no optical disc 8 is present, that is, optical disc 8 is not inserted inside of optical disc device 2 (S1032). The process of determining the type of optical disc 8 ends in the foregoing manner.

Returning to the flowchart of FIG. 3, the following describes the case where the type of optical disc 8 is determined to be BD in step S102 (the first case and the second case in FIG. 5). After step S102, disc determiner 55 determines the number of layers of optical disc 8 (e.g., any one of single-layer, dual-layers, or triple-layers), on the basis of the number of s-shape curves included in the normalized FE signal (S103).

Next, dirt determiner 56 tentatively determines a predetermined amplification factor in received-light signal gain adjuster 34 of light receiving element 30 to be, for example, the middle level, on the basis of the determination results in step S102 and S103 (S104).

Dirt determiner 56 then determines whether the peak level of the FS signal from FS signal generator 54 is greater than or equal to dirt determination threshold TH2 (S105).

When peak level PL3 of the FS signal is greater than or equal to dirt determination threshold TH2 (YES in S105), as in the first case in (c) in FIG. 5, dirt determiner 56 determines that no tobacco dirt is present inside of optical pickup 4 (S106). In this case, dirt determiner 56 maintains the predetermined amplification factor in received-light signal gain adjuster 34 of light receiving element 30 at, for example, the middle level (S107).

After that, disc determiner 55 determines whether optical disc 8 is ROM-type disc or R/RW-type disc, on the basis of a comparison between a PP signal (signal generated by push-pull method) and a DPD signal (signal generated by phase difference method) of the TE signal (S108). Dirt determiner 56 makes the final determination of the predetermined amplification factor in received-light signal gain adjuster 34 of light receiving element 30, also in consideration of the determination result in step S108 (S109), and the process ends.

Returning to step S105, when peak level PL4 of the FS signal is less than dirt determination threshold TH2, as in the second case in (c) in FIG. 5 (NO in S105), dirt determiner 56 determines that tobacco dirt is present inside of optical pickup 4 (S110). This is because the presence of tobacco dirt in the optical system (objective lens 24, cylindrical lens 28, light receiving element 30, etc.) of optical pickup 4 results in a decrease in the light amount of reflected light received by light receiving element 30 and thus in a decrease in the peak level of the received-light signals outputted from light receiving element 30. In this case, dirt determiner 56 increases the predetermined amplification factor in received-light signal gain adjuster 34 of light receiving element 30 from, for example, the middle level to the high level (S111).

This enables the peak level of each of the received-light signals from light receiving element 30 to be close to the peak level of a received-light signal that is emitted when no tobacco dirt is present inside of optical pickup 4. This results in an increase in the peak level of each of the FE signal generated by FE signal generator 40, the TE signal generated by TE signal generator 46, the RF signal generated by RF signal generator 52, and the FS signal generated by FS signal generator 54. Step S111 is followed by the foregoing step S108.

Note that the foregoing description of steps S103 through S109 explains the case where the type of optical disc 8 is determined to be BD in step S102, but the same is applicable to the case where the type of optical disc 8 is determined to be DVD or CD in step S102. Stated differently, dirt determiner 56 may determine that dirt is present in optical pickup 4, when disc determiner 55 determines that the type of optical disc 8 is DVD (or CD), and the peak level of the FS signal is less than the dirt determination threshold, and control received-light signal gain adjuster 34 to increase the predetermined amplification factor.

1-3. Effects

In the conventional optical disc devices, the presence of dirt in the optical pickup decreases the peak level of received-light signals from the light receiving element. As such, for example, the peak level of each of the FE signal, the TE signal, the RF signal, and the FS signal decreases. This results in, for example, failure of being unable to correctly perform focus control and tracking control, and in degradation in the RF signal. Consequently, it becomes impossible to accurately record or reproduce information on or from an optical disc.

In contrast, optical disc device 2 in the present embodiment is an optical disc device that records or reproduces information on or from optical disc 8 by irradiating optical disc 8 with laser light. Optical disc device 2 includes: optical pickup 4 including (i) first laser light source 10 and second laser light source 12 (laser light source), each emitting laser light, (ii) objective lens 24 that focuses each laser light emitted from first laser light source 10 and second laser light source 12 onto optical disc 8, and (iii) light receiving element 30 that receives reflected light from optical disc 8, and performs photoelectric conversion on the reflected light received to output a received-light signal; FS signal generator 54 (light amount signal generator) that generates an FS signal (light amount signal) indicating the light amount of the reflected light from optical disc 8, on the basis of the received-light signal from light receiving element 30; and dirt determiner 56 that determines that dirt is present in optical pickup 4, when the peak level of the FS signal is less than a dirt determination threshold (first threshold), and controls light receiving element 30 to increase the peak level of the received-light signal from light receiving element 30.

With this, dirt determiner 56 controls light receiving element 30 to increase the peak level of the received-light signal from light receiving element 30, when dirt determiner 56 determines that dirt is present in optical pickup 4. This enables the peak level of each of the received-light signals from light receiving element 30 to be close to the peak level of a received-light signal that is emitted when no tobacco dirt is present inside of optical pickup 4. This results in, for example, an increase in the peak level of each of the FE signal generated by FE signal generator 40, the TE signal generated by TE signal generator 46, the RF signal generated by RF signal generator 52, and the FS signal generated by FS signal generator 54. This enables accurate recording or reproduction of information on or from optical disc 8.

Also, optical disc device 2 in the present embodiment further includes: FE signal generator 40 that generates an FE signal on the basis of the received-light signal from light receiving element 30; and AGC circuit 42 (first automatic gain controller) that generates a normalized FE signal that is a ratio between the FE signal and an FS signal.

With this, it is possible to amplify the normalized FE signal in a supplemental manner in addition to increasing the peak level of the received-light signals from light receiving element 30 by updating, where necessary, the parameter of automatic gain control performed by AGC circuit 42. This enables further accurate recording or reproduction of information on or from optical disc 8.

Also, optical disc 8 in the present embodiment includes a BD (first optical disc) and a DVD (second optical disc) that are different in type. The laser light source includes first laser light source 10 that emits laser light for BD (first laser light) with which the BD is irradiated and second laser light source 12 that emits laser light for DVD (second laser light) with which the DVD is irradiated. Optical disc device 2 further includes disc determiner 55 that determines whether the type of optical disc 8 is BD, on the basis of a comparison between a peak-to-peak amplitude of the normalized FE signal and the BD determination threshold (second threshold), when first laser light source 10 emits the laser light for BD. Dirt determiner 56 determines that dirt is present in optical pickup 4 when the peak level of the FS signal is less than the dirt determination threshold in the case where the identification result of LD type identifier 57 indicates the laser light for BD and disc determiner 55 determines that the type of optical disc 8 is BD.

As in the second case and the third case in (c) in FIG. 5, for example, the mere comparison between the peak level of the FS signal and the dirt determination threshold cannot distinguish, in some cases, between whether optical disc 8 is BD and dirt is present in optical pickup 4 and whether optical disc 8 is other than BD. For this reason, by comparing the peak level of the FS signal and the dirt determination threshold after the type of optical disc 8 is determined to be BD, it is possible to accurately determine whether dirt is present in optical pickup 4.

Also, light receiving element 30 in the present embodiment includes: received-light signal generator 32 that receives the reflected light from optical disc 8 and performs photoelectric conversion on the reflected light received to generate a received-light signal; and received-light signal gain adjuster 34 that amplifies, at a predetermined amplification factor, the received-light signal generated. When the peak level of the FS signal is less than the dirt determination threshold in the case where the identification result of LD type identifier 57 indicates the laser light for BD and disc determiner 55 determines that the type of optical disc 8 is the BD, dirt determiner 56 determines that dirt is present in optical pickup 4, and controls received-light signal gain adjuster 34 to increase the predetermined amplification factor.

With this, it is possible to easily increase the peak level of the received-light signals from light receiving element 30.

1-4. Variation

In the present embodiment, when, for example, disc determiner 55 determines that the type of optical disc 8 is BD, and the peak level of the FS signal is less than the dirt determination threshold, dirt determiner 56 determines that dirt is present in optical pickup 4 and controls received-light signal gain adjuster 34 to increase the predetermined amplification factor. However, the present disclosure may be configured as described below.

That is to say, in the present variation, optical disc device 2 further includes TE signal generator 46 that generates a TE signal on the basis of received-light signals from light receiving element 30 and AGC circuit 48 (second automatic gain controller) that generates a normalized TE signal that is a ratio between the TE signal and an FS signal.

With this, it is possible to amplify the normalized TE signal in a supplemental manner in addition to increasing the peak level of the received-light signals from light receiving element 30 by updating, where necessary, the parameter of automatic gain control performed by AGC circuit 48. This enables further accurate recording or reproduction of information on or from optical disc 8.

Embodiment 2

2-1. Configuration of Optical Disc Device

Figure 6:
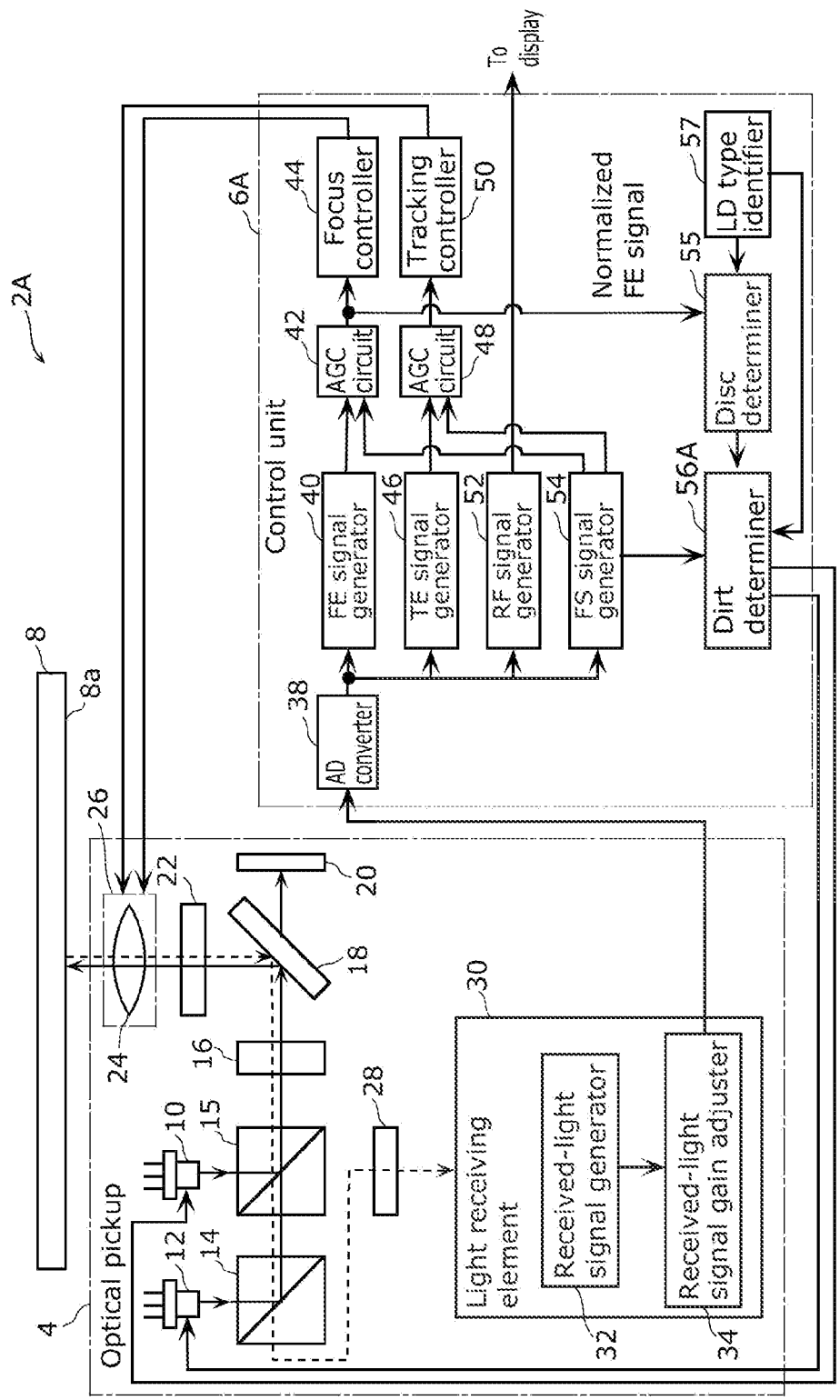
FIG. 6 is a diagram showing the configuration of an optical disc device according to Embodiment 2.

With reference to FIG. 6, the configuration of optical disc device 2A according to Embodiment 2 will be described. FIG. 6 is a diagram showing the configuration of optical disc device 2A according to Embodiment 2. In the present embodiment, the same elements as those of Embodiment 1 described above are assigned the same reference marks and will not be described.

As shown in FIG. 6, optical disc device 2A according to Embodiment 2 is different from Embodiment 1 described above in the process performed by dirt determiner 56A of control unit 6A. More specifically, when disc determiner 55 has determined the type of optical disc 8, and the peak level of the FS signal is less than the dirt determination threshold, dirt determiner 56A determines that dirt is present in optical pickup 4 and controls first laser light source 10 and second laser light source 12 to increase the intensity of laser light emitted from each of first laser source 10 and second laser source 12.

2-2. Operation of Optical Disc Device

Figure 7:
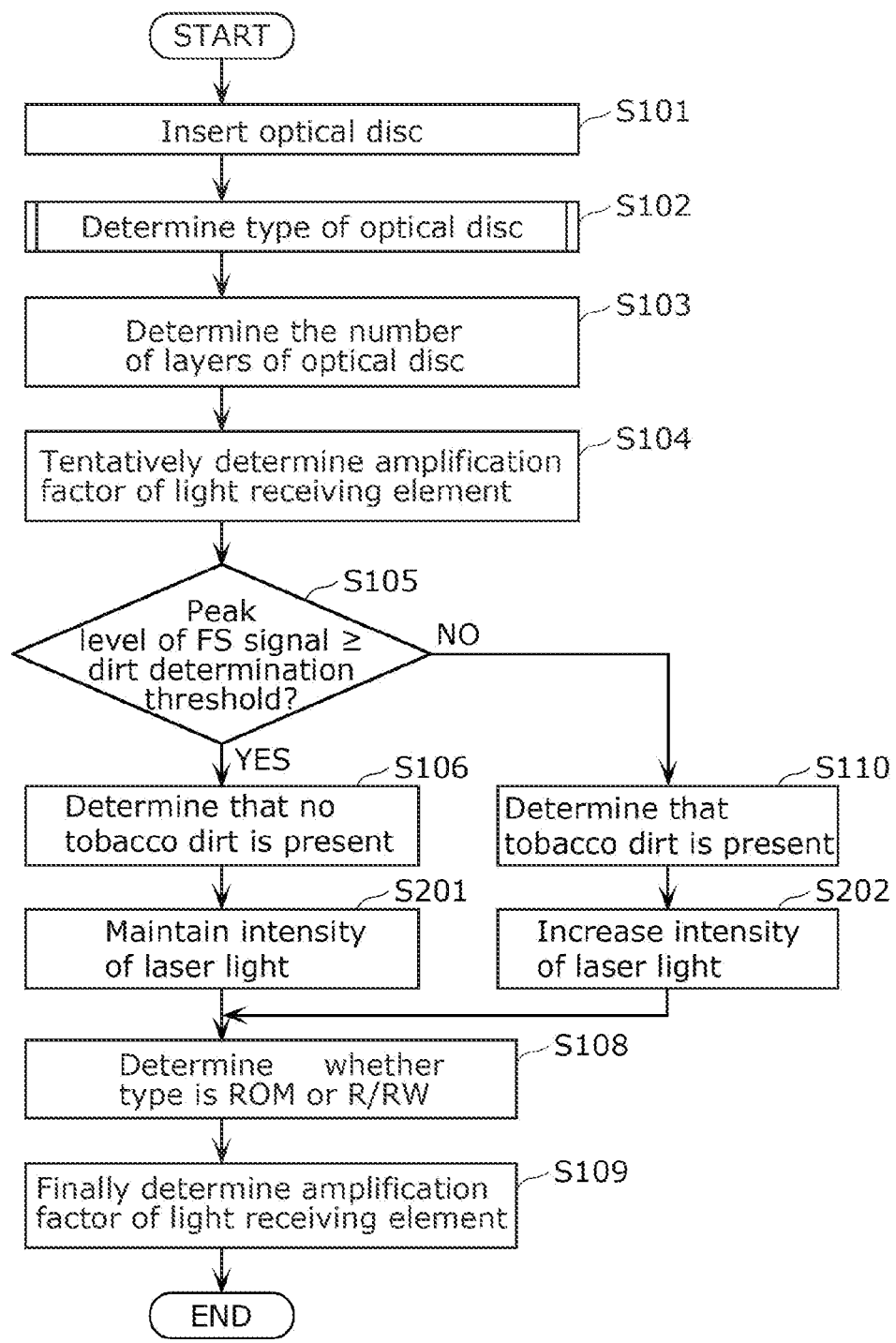
FIG. 7 is a flowchart showing the flow of an operation performed by the optical disc device according to Embodiment 2.

With reference to FIG. 7, the following describes an operation performed by optical disc device 2A according to Embodiment 2. FIG. 7 is a flowchart showing the flow of the operation performed by optical disc device 2A according to Embodiment 2. In the flowchart of FIG. 7, the same processes as those shown in the flowchart of FIG. 3 described above are assigned the same step numbers and will not be described.

As with Embodiment 1 described above, steps S101 through S105 are performed, and when the peak level of the FS signal is greater than or equal to the dirt determination threshold (YES in S105), dirt determiner 56A determines that no tobacco dirt is present inside of optical pickup 4 (S106). In this case, dirt determiner 56A controls first laser light source 10 and second laser light source 12 to maintain the intensity of laser light emitted from each of first laser light source 10 and second laser light source 12 (S201). This is followed by step S108 described above.

Returning to step S105, when the peak level of the FS signal is less than the dirt determination threshold (NO in S105), dirt determiner 56A determines that tobacco dirt is present inside of optical pickup 4 (S110). In this case, dirt determiner 56A controls first laser light source 10 and second laser light source 12 to increase the intensity of laser light emitted from each of first laser light source 10 and second laser light source 12 (S202).

This enables the peak level of each of the received-light signals from light receiving element 30 to be close to the peak level of a received-light signal that is emitted when no tobacco dirt is present inside of optical pickup 4, as with Embodiment 1 described above. This results in an increase in the peak level of each of the FE signal generated by FE signal generator 40, the TE signal generated by TE signal generator 46, the RF signal generated by RF signal generator 52, and the FS signal generated by FS signal generator 54. Step S202 is followed by the foregoing step S108.

2-3. Effects

In the present embodiment, when disc determiner 55 determines that the type of optical disc 8 is BD, and the peak level of the FS signal is less than the dirt determination threshold, dirt determiner 56A determines that dirt is present in optical pickup 4 and controls first laser light source 10 and second laser light source 12 to increase the intensity of laser light emitted from each of first laser light source 10 and second laser light source 12.

With this, dirt determiner 56A controls first laser light source 10 and second laser light source 12 to increase the peak level of each of the received-light signals from light receiving element 30 when dirt determiner 56A determines that dirt is present in optical pickup 4. This enables the peak level of each of the received-light signals from light receiving element 30 to be close to the peak level of a received-light signal that is emitted when no tobacco dirt is present inside of optical pickup 4. This results in, for example, an increase in the peak level of each of the FE signal generated by FE signal generator 40, the TE signal generated by TE signal generator 46, the RF signal generated by RF signal generator 52, and the FS signal generated by FS signal generator 54. This enables accurate recording or reproduction of information on or from optical disc 8.

Variation and Others

The embodiments have been described above to illustrate the technology disclosed in the present application. However, the technology of the present discourse is not limited to the embodiments and thus also applicable to the embodiments to which modification, replacement, addition, omission, and so forth are applied where necessary. Also, elements described in the foregoing embodiments can be combined to serve as a new embodiment.

In view of this, the following describes other example embodiments.

The foregoing embodiments describe tobacco dirt as an example of dirt in optical pickup 4, but the present disclosure is not limited to this. Dirt may thus be dust dirt, water stain caused by a humidifier, and so forth.

Each of the elements in each of the foregoing embodiments may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory.

Also, some, or all of the functions of optical disc device 2 according to each of the foregoing embodiments may be realized by a processor such as a CPU executing a program.

The embodiments have been described above to illustrate the technology of the present disclosure, for which the accompanying drawings and detailed description have been provided.

To illustrate the above technology, the elements described in the accompanying drawings and detailed description can thus include not only the elements essential to solve the problem, but also elements not essential to solve the problem. Therefore, the fact that such non-essential elements are illustrated in the accompanying drawings and detailed description should not lead to the immediate conclusion that such elements are essential.

Also note that the foregoing embodiments are intended for illustrating the technology of the present disclosure, and thus allow for various modifications, replacements, additions, omissions, and so forth made thereto within the scope of the claims and its equivalent scope.

INDUSTRIAL APPLICABILITY

The optical disc device of the present disclosure is applicable, for example, to a BD recorder capable of recording or reproducing information on or from an optical disc.

The invention claimed is:

1. An optical disc device that records or reproduces information on or from an optical disc by irradiating the optical disc with laser light, the optical disc device comprising:
    an optical pickup including:
        a laser light source that emits the laser light,
        an objective lens that focuses the laser light emitted from the laser light source onto the optical disc, and
        a light receiving element that receives reflected light from the optical disc, and performs photoelectric conversion on the reflected light received to generate a received-light signal, amplifies the received-light signal to an amplified received-light signal at a predetermined amplification factor, and outputs the amplified received-light signal;
    a light amount signal generator that generates a light amount signal indicating a light amount of the reflected light from the optical disc, based on the amplified received-light signal from the light receiving element; and
    a dirt determiner that determines that dirt is present in the optical pickup, when a peak level of the light amount signal is less than a first threshold, and controls the light receiving element to increase a peak level of the amplified received-light signal by increasing the predetermined amplification factor.

2. The optical disc device according to claim 1, further comprising:
    a focus error signal generator that generates a focus error signal, based on the amplified received-light signal from the light receiving element; and
    a first automatic gain controller that generates a normalized focus error signal that is a ratio between the focus error signal and the light amount signal, wherein:
    the optical disc device is configured to work with a first optical disc and a second optical disc that are different in type,
    the laser light source includes a first laser light source that emits first laser light with which the first optical disc is irradiated and a second laser light source that emits second laser light with which the second optical disc is irradiated,
    the optical disc device further comprises a disc determiner that determines whether a type of the optical disc is the first optical disc, based on a comparison between a peak-to-peak amplitude of the normalized focus error signal and a second threshold, when the first laser light source emits the first laser light,
    the dirt determiner determines that dirt is present in the optical pickup, when the disc determiner determines that the type of the optical disc is the first optical disc, and the peak level of the light amount signal is less than the first threshold,
    the light receiving element includes:
        a received-light signal generator that receives the reflected light from the optical disc, and performs the photoelectric conversion on the reflected light received to generate the received-light signal; and
        a received-light signal gain adjuster that amplifies, at the predetermined amplification factor, the received-light signal to the amplified received-light signal, and
    when the disc determiner determines that the type of the optical disc is the first optical disc, and the peak level of the light amount signal is less than the first threshold, the dirt determiner determines that dirt is present in the optical pickup, and controls the received-light signal gain adjuster to increase the predetermined amplification factor.

3. A recording and reproduction device comprising the optical disc device according to claim 1.

* * * * *